(12) United States Patent
Boger et al.

(10) Patent No.: US 8,475,557 B2
(45) Date of Patent: Jul. 2, 2013

(54) CELLULAR CERAMIC ARTICLES WITH COATED CHANNELS AND METHODS FOR MAKING THE SAME

(75) Inventors: Thorsten Rolf Boger, Painted Post, NY (US); Willard Ashton Cutler, Elmira, NY (US); Kenneth Joseph Drury, Big Flats, NY (US); Todd Parrish St Clair, Painted Post, NY (US); Patrick David Tepesch, Corning, NY (US); John Forrest Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 42 days.

(21) Appl. No.: 13/219,016

(22) Filed: Aug. 26, 2011

(65) Prior Publication Data
US 2012/0047860 A1 Mar. 1, 2012

Related U.S. Application Data

(60) Provisional application No. 61/378,486, filed on Aug. 31, 2010.

(51) Int. Cl.
*B01D 39/14* (2006.01)
*B01D 39/06* (2006.01)
*B01D 24/00* (2006.01)
*B01D 50/00* (2006.01)

(52) U.S. Cl.
USPC .......... 55/523; 55/522; 55/524; 422/169; 422/170; 422/171; 422/172; 422/177; 422/178; 422/179; 422/180; 422/181; 422/182

(58) Field of Classification Search
USPC ............ 55/522–524; 422/169–172, 177–182
See application file for complete search history.

(56) References Cited

U.S. PATENT DOCUMENTS

| | | | |
|---|---|---|---|
| 5,106,502 A | 4/1992 | Goldsmith | 210/490 |
| 5,198,007 A | 3/1993 | Moyer et al. | 55/523 |
| 6,840,976 B2 | 1/2005 | Vance et al. | 55/523 |
| 7,179,430 B1 | 2/2007 | Stobbe et al. | 422/180 |
| 7,384,442 B2 | 6/2008 | Bardhan et al. | 55/523 |
| 7,718,143 B2 * | 5/2010 | Ogura | 422/180 |
| 2002/0175451 A1 | 11/2002 | Vance et al. | 264/631 |
| 2004/0191133 A1 * | 9/2004 | Yamaguchi | 422/180 |
| 2005/0074374 A1 * | 4/2005 | Ogura | 422/180 |
| 2007/0140928 A1 * | 6/2007 | Beall et al. | 422/177 |
| 2010/0135866 A1 | 6/2010 | Mizuno et al. | 422/180 |
| 2010/0247400 A1 * | 9/2010 | Tokuda et al. | 422/180 |
| 2010/0257843 A1 * | 10/2010 | Hoke et al. | 60/274 |
| 2010/0303677 A1 * | 12/2010 | Henry et al. | 422/171 |
| 2011/0212831 A1 * | 9/2011 | Goto et al. | 502/100 |
| 2011/0274601 A1 * | 11/2011 | Boorse | 423/213.2 |
| 2012/0009092 A1 * | 1/2012 | Mizutani et al. | 422/177 |
| 2012/0070346 A1 * | 3/2012 | Mizutani et al. | 422/178 |
| 2012/0159938 A1 * | 6/2012 | Fekety et al. | 60/311 |

FOREIGN PATENT DOCUMENTS

| | | |
|---|---|---|
| EP | 2108494(A2) | 4/2009 |
| WO | 2008/079668 | 7/2008 |

* cited by examiner

*Primary Examiner* — Amber Orlando
(74) *Attorney, Agent, or Firm* — Matthew J. Mason (57) ABSTRACT

Cellular ceramic articles are manufactured from a green cellular ceramic body that includes a binder material and a plurality of channels. At least one of the channels is coated with a slurry that includes a green coating composition and a solvent to form a coating layer. The binder material is insoluble in the solvent.

16 Claims, 12 Drawing Sheets

CELLULAR CERAMIC ARTICLES WITH COATED CHANNELS AND METHODS FOR MAKING THE SAME

CROSS-REFERENCE TO RELATED APPLICATIONS

This application claims the benefit of priority under 35 U.S.C. §119 of U.S. Provisional Application Ser. No. 61/378,486 filed on Aug. 31, 2010 the content of which is relied upon and incorporated herein by reference in its entirety.

BACKGROUND

The disclosure relates generally to cellular ceramic articles and more particularly to cellular ceramic articles having channels that are coated with a slurry material while in a green state.

Diesel particulate filters and catalyst substrates made of extruded honeycomb ceramics are key components in modern engine after treatment systems designed to meet current and future emission legislation. Cordierite is currently the dominant material of choice for substrates and is used for diesel particulate filters as well, especially for heavy-duty applications. Cordierite-based filters are also considered for gasoline particulate filters, should future emission standards require the need for such. Other material choices include stabilized aluminum titanate (AT) and silicon carbide (SiC), either re-crystallized or Si-bonded.

Such products are typically manufactured by an extrusion process followed by drying and high temperature thermal treatment processes (firing). For filters, an additional step is required to plug honeycomb channels. Cordierite and aluminum titanate honeycombs are synthetic ceramics for which the extrusion batch primarily comprises precursor materials such as alumina, silica, titania, etc. that react during the firing step to form the finished ceramic. Additional components are added to adjust rheological properties and to aid formation of pores with the desired structure. As the final material is obtained only after chemical reaction of the raw materials during the high temperature thermal treatment, prior to that treatment, the honeycomb structures and batch material are usually referred to as being in the "green" state.

In addition to possible material differences, the honeycomb structures used today for filters and substrates also differ in the number of cells per unit area, typically expressed as cells per square inch (cpsi), the web thickness, and the porosity characteristics of the wall material, namely porosity and pore size distribution. All of the extruded products commercially manufactured today have essentially uniform porosity and pore size distribution along the wall from inlet to outlet face and across the webs from one channel to the adjacent channel, with the porous characteristics determined primarily by the composition of the green batch and the subsequent thermal treatment steps. Furthermore, such products have essentially constant web thickness from inlet to outlet, as determined by the dimensions of the extrusion die. In contrast, products with varying web thickness in the radial direction to increase mechanical strength, i.e. the web thickness increases from the center to the skin, are commercially available. This variability is typically designed through different slot sizes of the extrusion die and again does not change along the main axis of the part.

For applications requiring only a substrate (where no channels are plugged as they are in diesel particulate filters), a catalytically active material is disposed on the substrate, typically via a washcoating process. In this process, the catalytically active material is applied in the form of a slurry, with the catalyst materials being dispersed and dissolved therein. Driven by a slip casting effect, the catalyst particles are deposited primarily onto the geometric surface of the substrate with some portion actually penetrating into the substrate pore structure and acting as anchors to provide good adhesion between the coating and substrate walls. To increase the degree of adhesion, a web surface with high porosity and a tailored pore size is desirable. However, to prevent excessive penetration of the coating into the wall, where the catalyst utilization would be lower due to diffusion limitations, a web surface with lower porosity and finer pores is desirable. In addition, a very low porosity substrate has an advantage in mechanical strength.

In the case of soot filtration inside a so-called wall flow filter, as used on diesel engines today, the pressure drop increases as soot becomes trapped in the filter walls. This is undesirable from both engine operation and fuel economy perspectives. To manage the overall pressure drop of the system the filter is frequently exposed (regenerated) to conditions during which the accumulated carbon-based matter is oxidized. In general, pressure drop is determined by the geometry of the honeycomb in terms of hydraulic diameter of the channels, open area for flow and web thickness and geometric or filtration area. In addition, in the presence of soot the pressure drop increases due to the amount of soot that penetrates into the microstructure (deep bed filtration) as well as the amount of soot that accumulates on the filter wall surface (cake filtration). Due to flow restrictions in the porous wall and higher specific velocities, the impact of deep bed soot (deposited inside the porous wall) on pressure drop is significantly more pronounced compared to soot deposited as cake. It has been observed that this effect is reduced when the pore size is reduced, typically below a mean pore size of ~10 µm. A drawback to decreasing the pore size is that the wall permeability, even without soot, decreases proportionally to the square of the pore size and linearly with wall thickness. Accordingly, a thin surface layer with both small pore size and high porosity supported by a substrate with large pore size and high porosity would serve to address at least some of these concerns.

As described above, the increase in pressure drop with accumulation of soot requires frequent regeneration of the filter and removal by oxidation of the accumulated soot. Under certain conditions, referred to as uncontrolled regeneration, the heat release during this oxidation step can be significant, resulting in an increase in the temperature inside the filter. In extreme cases, this can lead to filter damage due to thermal stresses or even melting. For filter materials, a strong correlation between the volumetric heat capacity (bulk density×specific heat capacity) and the peak temperature observed during extreme soot regeneration events has been found. For high values of the volumetric heat capacity, lower temperatures are observed. As a result, for a given material with a given specific heat capacity (J/kgK) and a given maximum temperature, a higher bulk density is required for increased soot mass limit. The latter can be achieved by either using a lower porosity material or designing a filter with lower open channel volume, i.e. thicker webs. In filter applications, the highest temperatures are usually observed at the filter exit, so having a higher density at the exit would mitigate the increases in temperature. With respect to pressure drop, however, filters with higher porosity and thinner walls are desirable. Analogous to the trade off described above for substrates, the filter designs must be optimized to balance these opposing characteristics, however such designs have not been shown to be economically obtained via a continuous extrusion process.

Catalytically active materials are now being coated not only on substrates but on some filters as well. The catalytic coating of plugged particulate filters typically is found inside the porous wall structure. This is in many cases desirable from a permeability perspective and often driven by the coating process in which the slurry is forced to flow through the walls due to the alternate plugging pattern of the filter channels. A common limitation is that any separation of catalyst functionality, i.e. due to the presence of more than one type of catalytic active material, across the web or wall is technically difficult to achieve. Having an asymmetric pore structure with small pores on one side of the wall would help to sieve/slip-cast the catalyst particles of a slurry applied from this side of the wall, preventing substantial penetration into the pore structure. An additional catalyst material could be applied from the other side of the web with resulting deposition for example into the porous wall structure. With current filter products of homogenous pore size and pore structure across the web, this is challenging at best, if not impossible.

The above application examples, although not exhaustive, demonstrate the need for substrate and filter substrate bodies with webs that have different properties either along the web from inlet to outlet face or across the web from one channel to the adjacent channels. However, such designs cannot be obtained in an economically viable manner via the continuous extrusion process. Existing methods to generate structures with such variability on a web scale are based on applying a slurry, analogous to the catalyst coating process described above, to the fired substrate body. These methods, however, require additional thermal treatment steps, generally create an interface with different thermo-mechanical properties that will result in thermal stresses, and have lower permeability as the pore structures are not continuous but rather in separate layers. The latter can be addressed to some extent by using a multitude of layers with a gradient in properties but this comes at a high manufacturing cost.

SUMMARY

One embodiment of the disclosure relates to a method of manufacturing a cellular ceramic article. The method includes providing a green cellular ceramic body that includes a binder material and a plurality of channels. In addition, the method includes coating at least one of the plurality of channels with a slurry comprising a green coating composition and a solvent to form a coating layer on at least one of the plurality of channels. Preferably, the binder material is insoluble in the solvent and the at least one of the plurality of channels is unplugged when coated with the slurry.

Another embodiment of the disclosure relates to a green cellular ceramic body. The green cellular ceramic body includes a binder material and a plurality of channels. A coating layer is on at least one of the plurality of channels. The coating layer is formed from a slurry that includes a green coating composition and a solvent. Preferably, the binder material is insoluble in the solvent and the at least one of the plurality of channels coated with the coating layer is unplugged.

Yet another embodiment of the disclosure relates to a cellular ceramic article fired from a green cellular ceramic body. The green cellular ceramic body includes a binder material and a plurality of channels. A coating layer is on at least one of the plurality of channels. The coating layer is formed from a slurry that includes a green coating composition and a solvent. Preferably, the binder material is insoluble in the solvent and the at least one of the plurality of channels coated with the coating layer is unplugged.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Disclosed herein is a novel process for tailoring the properties of porous cellular ceramic articles. The process includes applying a thin green coating to the walls of a green cellular ceramic and subsequently firing the coated ware to convert both the coating and the wall to a porous ceramic filter. The green cellular body is preferably an extruded honeycomb comprising inorganic precursors, organic and inorganic binders, pore formers, oil, and water. The green coating is preferably a mixture of a suitable liquid vehicle, selected from among liquids that do not compromise the green substrate body, inorganic precursors and optional pore formers. Examples of suitable liquid vehicles include alcohols having an acceptable properties, such as an acceptable degree of hydrophobicity and volatility, although other suitable liquids can also be used. The other inorganic and organic raw materials of the green coating can be similar in nature or identical to those used in the making of the green substrate body. In addition, similar technical approaches can be applied to tailor the properties of the coating, such as for example its pore size and porosity. When the green coating and substrate are fired, the precursors and pore formers present in both will react and/or burn off, leading to a porous ceramic body with a well-connected solid phase.

As the coating is applied in the green state, while the walls of the green ware have low porosity with small diameter compared to a fired body, formation of at least two relatively discrete regions across the wall can be formed, one determined by the green composition of the substrate material and the other determined by the green composition of the coating. A higher number of regions can be observed if, for example, both sides of the channel wall are coated or if multiple coatings of different composition are applied. Because the reaction preferably occurs simultaneously with sintering, all regions are enabled to be well-connected and continuous in terms of the solid phase. The pore space in both regions can also be very well connected, as the gaseous products from the pore forming additives have to escape through the coating layer.

Spatial properties of the resulting fired coated ceramic can be significantly altered by the selection of the composition of the green coating. For example, through suitable selection of particle size and batch materials, coatings with higher or lower pore size and/or porosity or even different chemical composition compared to the base substrate material region can be formed. Adding the coating in the green state can not only improve the properties and uniformity of this coating, but can also significantly decrease the cost and complexity in manufacturing inorganic membranes for at least the reason that only a single firing step is required. In comparison, conventional methods for manufacturing inorganic membranes typically consist of multiple coating, drying and firing steps.

Providing monolithic substrate materials with properties that vary either across the wall or along the wall can address one or more problems found today in many applications. For example, the formation of a thin surface layer with smaller pore size and equal or higher porosity than the bulk wall may result in a beneficial decrease in deep bed filtration and a reduction in soot loaded pressure drop of a diesel particulate filter (DPF). In addition, such a layer may increase the filtration efficiency with minimal effect on backpressure. This thin surface layer can also facilitate the deposition of an on-wall catalytic coating for a DPF. The formation of a surface layer whose properties (porosity, pore size, and/or thickness) vary along the filter length could also be provided. For example, a filter whose wall thicknesses increased along the length could have reduced thermal axial gradients. Other examples for substrates include cases where a low porosity, high strength substrate is coated with a thin layer of higher porosity, pore size and surface roughness to increase adhesion of a catalyst coating applied to it.

When a percentage increase or decrease is disclosed herein, the percentage increase or decrease is to be understood as being relative to the size of the un-increased or decreased parameter being referenced. For example, if a wall or channel being coated by a coating layer has a surface porosity of 30%, the statement "the surface porosity of the coating layer is at least 5% greater than the surface porosity of a wall on the channel on which it is coated" is to be understood as describing a coating layer having a surface porosity of at least 1.05×30% and not at least 35%.

Figure 1A:
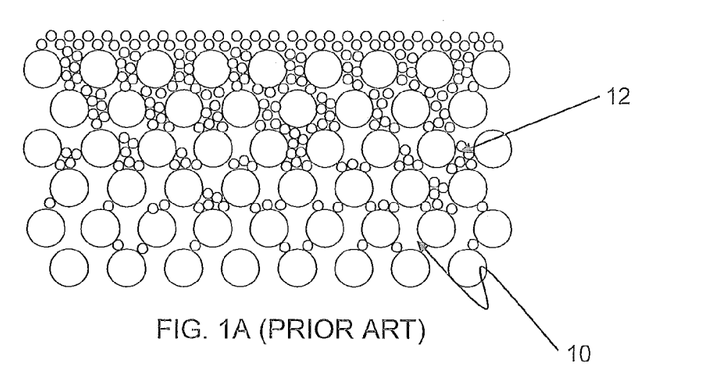
FIGS. 1A-1C schematically illustrate coating a coating composition onto the walls of fired ware as opposed to the walls of green ware.

Embodiments disclosed herein provide a process applied to green cellular ceramics that can modify particular properties in the resulting fired ware. Articles made by this process can also be provided. Coating green ware can have one or more advantages when compared to coating fired ware, particularly when the fired ware is substantially porous. A common problem with coating fired ware is that the particles that make up the coating can penetrate into the substrate if the pores are large enough. The challenge with this approach is illustrated schematically in FIG. 1A, where the particles 12 from the coating penetrate into the substrate pore structure 10, significantly decreasing the overall wall permeability.

Figure 1B:
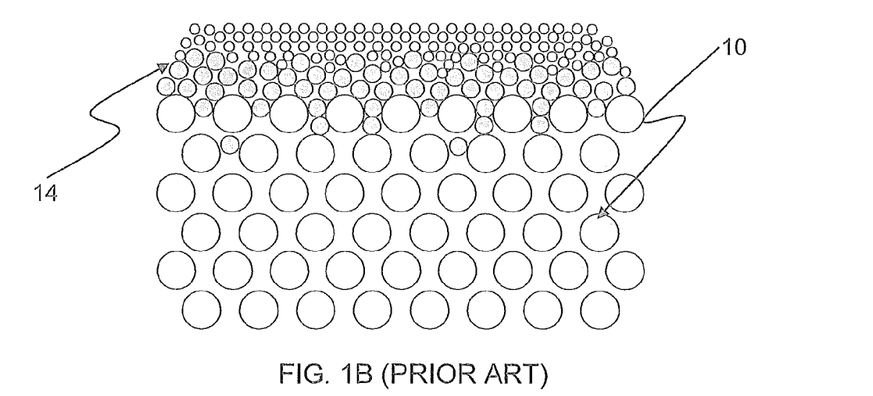

The conventional solution to this problem is to decrease the particle sizes stepwise in layers wherein smaller particles 12 are layered over larger particles 14, as shown in FIG. 1B, such that limited penetration occurs during any coating step. The material stack culminates in a top layer where the particle size and sintering conditions are chosen to achieve the final pore size and porosity. Each of the coating steps are typically performed at least twice to ensure that a continuous layer with the smaller particles is formed before the next smallest size particles are deposited. However, in the case of ceramic materials, this is an extremely costly process approach as multiple coating, drying, and (high temperature) firing steps are required.

Figure 1C:
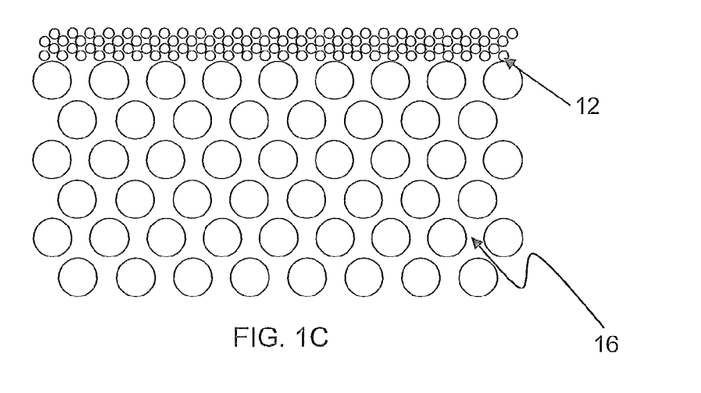

By coating relatively non-porous green ware 16, as shown in FIG. 1C, the particles 12 making up the slurry can be as small as desired since there is little-to-no porosity for the slurry to penetrate, resulting in a substantial decrease in cost and complexity of manufacturing. Another advantage is improved adhesion between the coating and the substrate because the ware and coating are both green, during firing the precursors react both within the coating and wall layers as well as across the interface to form the final product. Yet another advantage is that the coating that is formed is an on-wall coating, as the green ware typically has low porosity and very small pore diameter. This enables its use as a barrier layer, which may be very useful for forming on-wall catalyst coatings among other applications.

Figure 2:
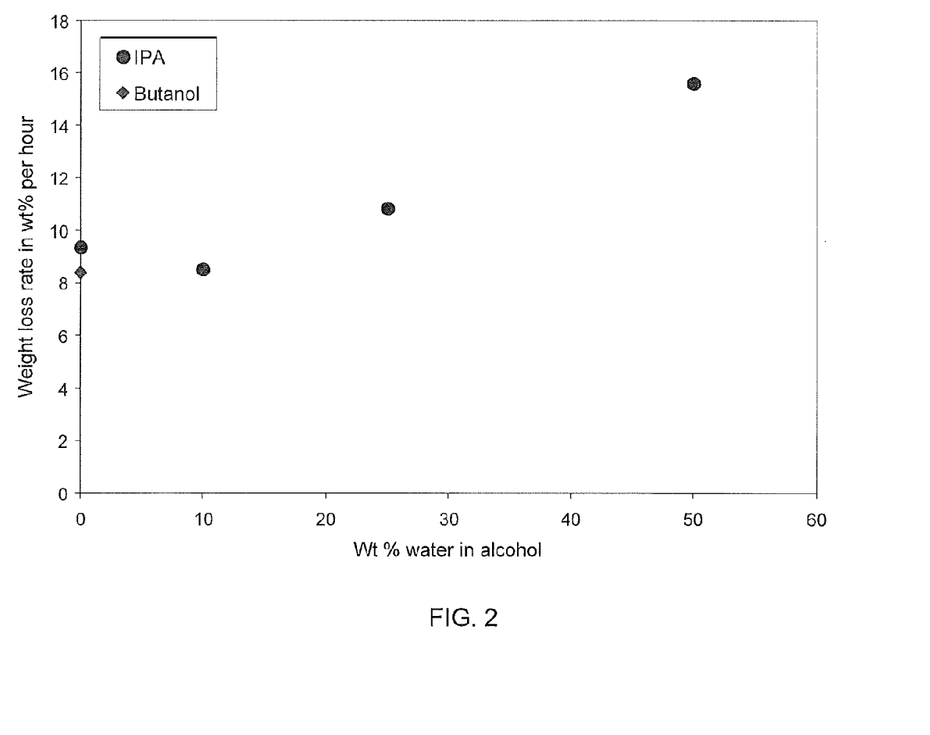
FIG. 2 plots rate of weight loss per hour for green ware soaked in solvent compositions having differing amounts of water content.

The solvent vehicle for the inorganic and pore former phases should be chosen such that the binder material in the green ware walls, for example, methylcellulose, is insoluble in the solvent. For example, if an aqueous-based slurry is used to apply a coating, the water in the slurry will dissolve some of the methylcellulose binder from the wall. To illustrate this point, slurries containing five different solvents were prepared and applied to cellular green ware. The first two solvents were alcohols, specifically butanol and isopropyl alcohol (IPA). The next three solvents were alcohol-water mixtures, specifically, isopropyl alcohol and 10% water, isopropyl alcohol and 25% water, and isopropyl alcohol and 50% water. As shown in FIG. 2, as the water content of the solvent is increased, the weight loss of the green ware in wt % per hour is also increased, which can lead to a significant weakening of the ultimate product.

Accordingly, provided herein is a method of manufacturing a cellular ceramic article that includes providing a green cellular ceramic body, the green cellular ceramic body comprising a binder material and a plurality of channels. The method also includes coating at least one of the plurality of channels with a slurry comprising a green coating composition and a solvent to form a coating layer on at least one of the plurality of channels. The binder material should be insoluble in the solvent. In addition, in preferred embodiments, the at least one of the plurality of channels is unplugged when coated with the slurry.

Suitable solvent components may include, for example, alcohols, ester alcohols, esters, hydrocarbons, aldehydes, ketones, and carboxylic acids. Preferably, the solvent used in the slurry comprises at least one primary, secondary or tertiary alcohol. Examples of alcohols that can be used as a solvent include methanol, ethanol, propanol, butanol, petnanol, and hexanol. An example of an ester alcohol that can be used is Texanol (2,2,4-Trimethyl-1,3-pentanediol monoisobutyrate) and an example of an ester that can be used is Optifilm Enhancer 300 (Propanoic acid,2-methyl-,1,1'-[2, 2-dimethyl-1-(1-methylethyl)-1,3-propanediyl]ester), both sold commercially by Eastman Chemical Company.

The green coating composition used in the slurry preferably includes inorganic precursors. The choice of inorganic precursors is dependent upon the desired composition. For example, the green coating composition may comprise materials such as alumina, titania, silica, strontium carbonate, calcium carbonate, and/or lanthanum oxide. The materials selected for the green coating composition can be the same or different from those chosen to form the ceramic composition in the bulk wall of the green cellular ceramic body, for example a green cellular ceramic body in which aluminum titanate is the main phase and a feldspar is a secondary phase. Pore former may be optionally added to the green coating composition to generate coating porosity. Although the amount and type of pore former can be varied depending on the desired porosity, preferred embodiments of pore formers include, for example, starch derived from potato, rice, and/or corn at about, for example, 1-50 wt % super-addition.

As discussed above, the green cellular ceramic body can, in one or more embodiments, comprise materials that upon firing react to form aluminum titanate (AT). However, the green cellular ceramic body is not limited to materials that react to form AT and can comprise any materials or mixtures of materials that upon high temperature treatments react to form oxide or non-oxide ceramics, including metals, intermetallics, mullite, cordierite, alumina ($Al_2O_3$), zircon, alkali and alkaline-earth alumino-silicates, spinels, persovskites, zirconia, ceria, silicon carbide (SiC), silicon nitride ($Si_3N_4$), silicon aluminum oxynitride (SiAlON), and zeolites.

A preferred binder material in the green cellular ceramic body is a cellulose ether. Examples of preferred cellulose ethers include methylcellulose and hydroxypropyl methylcellulose, including the Methocel family of products available from the Dow Chemical Company. Preferred binder materials may also include polyols, such as polyvinylalcohol (PVA).

In one set of exemplary embodiments, the green cellular ceramic body and the green coating composition can have the same or essentially the same ingredients. In another set of exemplary embodiments, the green cellular ceramic body and the green coating composition can have at least some different ingredients. In yet another set of exemplary embodiments, the green coating composition can comprise two or more different coating compositions. For example, the green coating composition may comprise a first coating composition having the same or essentially the same ingredients as the green cellular ceramic body and a second coating composition having at least some different ingredients than the green cellular ceramic body. Alternatively, the green coating composition may comprise two or more coating compositions that each have at least some different ingredients than the green cellular ceramic body. The two or more coating compositions may be coated on different channels of the ceramic, such as a first coating composition on inlet channels and a second coating composition on outlet channels.

For example, the green coating composition may include at least one material that upon firing reacts to form at least one material selected from the group consisting of aluminum titanate (AT), metals, intermetallics, mullite, cordierite, alumina ($Al_2O_3$), zircon, alkali and alkaline-earth alumino-silicates, spinels, persovskites, zirconia, ceria, silicon carbide (SiC), silicon nitride ($Si_3N_4$), silicon aluminum oxynitride (SiAlON), and zeolites, which can be the same or different from the material of the green cellular ceramic body. It should be noted that if the green coating composition is different from that of the green cellular ceramic body it should preferably be thermodynamically stable with the green cellular ceramic body upon firing or at least be kinetically limited at the sintering temperature.

The green coating composition may also include a binder material. The binder material should preferably be selected to provide green strength to the coating after drying and should preferably be dispersible in any liquid vehicle used in the green coating composition. Preferred materials for the green coating composition binder material include colloidal boehmite (AlOOH), colloidal silica, colloidal titania, tetraethylorthosilicate (TEOS), tetramethylorthosilicate (TMOS), aluminum alkoxide, titanium alkoxide, and polyvinyl butyral, although any binder that is soluble or dispersable in the liquid vehicle may be used. Modification of the surface chemistry of colloidal binders such as boehmite or silica may be necessary to ensure good dispersion in the solvent of choice. It is important to note that when using a binder material that converts to inorganic material upon heating, the green slip chemistry should preferably be adjusted to account for this additional inorganic to achieve the desired fired chemistry (e.g., AT, mullite, etc.).

Prior to coating channels of the green cellular ceramic body with the slurry, one or more of the plurality of channels may be masked such that the slurry is coated only on the channel or channels that are not masked. For example, in one set of preferred embodiments, channels intended to be plugged as outlet channels may be masked prior to coating the slurry such that slurry is coated only on channels intended to be plugged as inlet channels. Alternatively, channels intended to be plugged as inlet channels may be masked prior to coating the slurry such that slurry is coated only on channels intended to be plugged as outlet channels. In addition, channels may be masked such that different slurry compositions are coated on different channels and/or different amounts of slurry compositions are coated on different channels.

The application of coating can be accomplished by pouring the slurry over the top face of the green cellular ceramic body and allowing gravity to pull the slurry down the channels (waterfall method). The excess slurry in the channels can be forced out the ends of the monolith by pressurized air to distribute the coating along the axial direction, and to remove any material that may lead to channel plugging.

The application of coating can also be accomplished by dipping the green cellular ceramic body in the slurry. For example, in embodiments where the thickness of the coating layer is intended to vary along the axial length of at least some of the channels, the green cellular ceramic body can be dipped in the slurry for varying times and/or lengths along its axial length.

Additional methods of applying the coating can include using a vacuum to pull the slurry on the channels, and pumping the slurry onto the channels.

Figure 3:
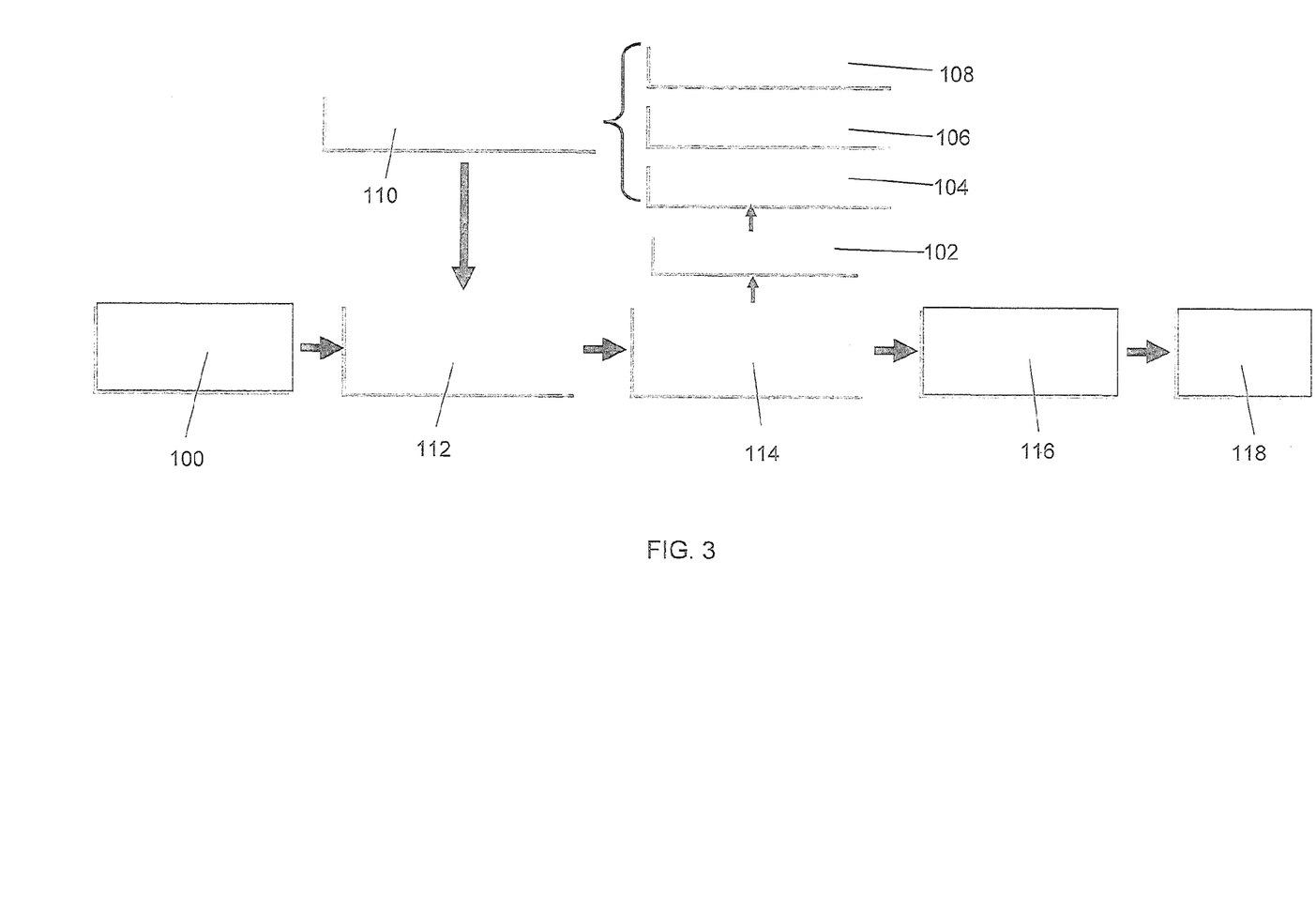
FIG. 3 schematically illustrates a flow diagram of a manufacturing process integrating coating processes described herein.

FIG. 3 schematically illustrates a process flow diagram showing an example of how coating processes described herein (shown in shaded boxes) can be integrated into a broader manufacturing process. Once the slurry is prepared 110, for example, from raw materials similar to those already existing in the process (e.g., from an inorganic package 108, pore former package 106, and slurry liquid 104), the coating step can be inserted as a step between drying 100 and firing 116 steps. In the exemplary process shown in FIG. 3, green cellular ceramic articles are coated with the slurry 112 and then dried in a dedicated drying step 114 which optionally recovers the slurry liquid 104 by methods well known in the art, such as condensation, adsorption, or absorption processes. The recovered liquid may also be recycled back 102 to the slurry preparation step. The coated and dried green substrate can then be fired in a firing process 116, according to methods known to those of ordinary skill in the art. Following the firing process, the resulting cellular ceramic article may be plugged (in the case of filters) and finished 118 according to methods known in the art.

Figure 4A:
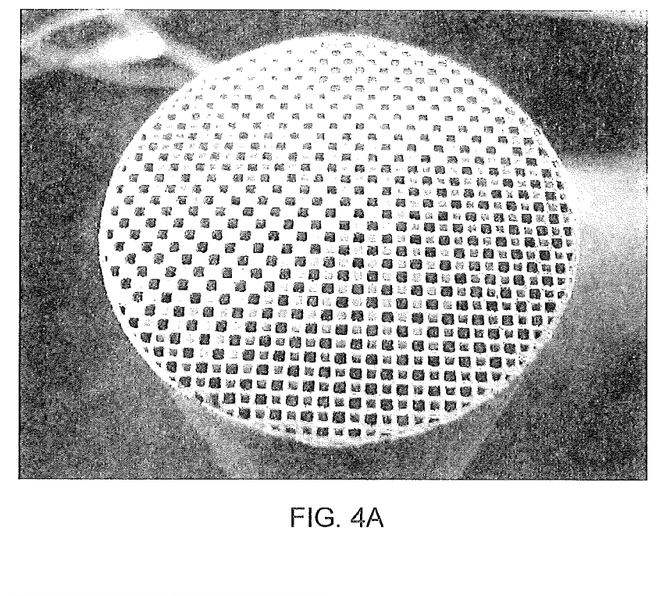
FIGS. 4A-4B show two optical images illustrating aspects of the coating of channels of a green cellular ceramic article according to processes disclosed herein.
Figure 4B:
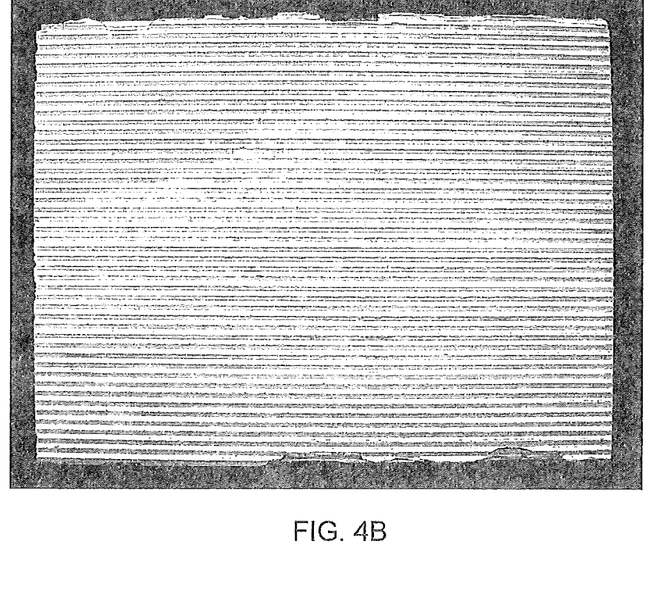

FIGS. 4A and 4B show two optical images illustrating aspects of the coating of channels of a green cellular ceramic article according to processes disclosed herein. FIG. 4A shows an end-on view of a green cellular ceramic sample which has been masked to block the outlet channels from coating (a continuous mask was applied to the endface and then a laser was used to burn off the masking material covering the inlet channels). FIG. 4B shows that the distribution of coating along the axial direction is excellent, and it is clear that only alternating channels were coated (bright color) whereas the others remained uncoated (dark color).

Figure 5A:
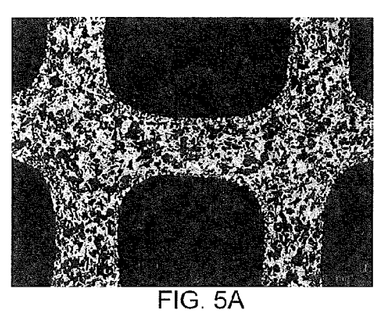
FIGS. 5A-5F show SEM images of cellular ceramic articles after firing, wherein a surface region on the coating layer has a porosity distinct from the that of bulk ceramic.
Figure 5B:
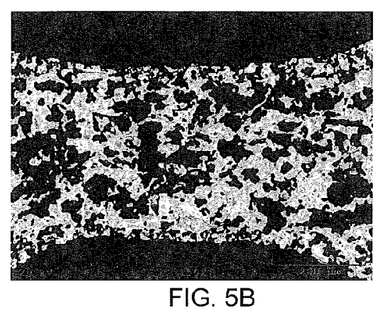
Figure 5C:
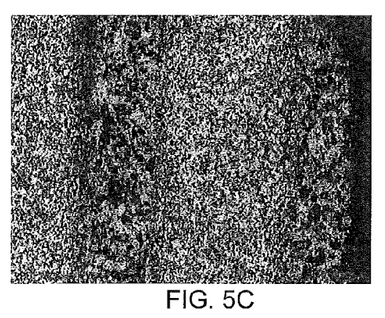
Figure 5D:
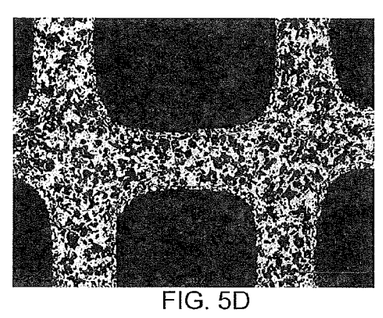
Figure 5E:
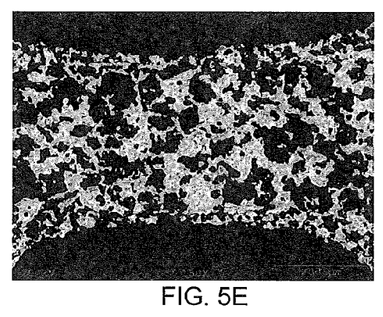
Figure 5F:
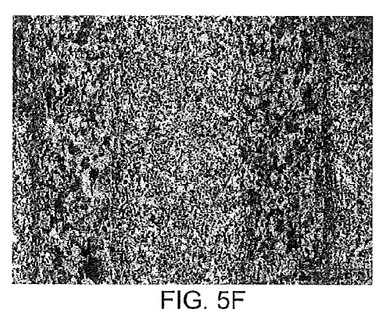

FIGS. 5A-5F show SEM images of cellular ceramic articles after firing, which show the formation of a surface region on the coating layer having a porosity distinct from the that of bulk ceramic. Specifically, FIGS. 5A-C show a first substrate that has been coated on both sides of channel walls with a coating composition providing for relatively small coating layer pore size ("small pore size coating") and FIGS. 5D-F show a second substrate that has been coated on both sides of channel walls with a coating composition providing for somewhat larger coating layer pore size ("medium pore size coating"). Polished cross sectional views of the first substrate at two levels of magnification are shown in FIGS. 5A-B and polished cross sectional views of the second substrate at the same two levels of magnification are shown in FIGS. 5D-E. A top-down channel view of the first substrate is shown in FIG. 5C and a top-down channel view of the second substrate is shown in FIG. 5F. Differences between surface and bulk porosity can be discerned by comparing polished cross-section and top-down channel views. The interface between the coating and substrate is difficult to distinguish providing reasonable evidence that the coating is well adhered.

The coating compositions for these examples are set forth in Table 1, wherein slurries were prepared by combining these as a powder with isopropanol. When preparing coating compositions, the ratio of powder to solvent used is typically a function of the desired coating thickness and the acceptable number of coating applications. Generally speaking, the more concentrated the slips are in solids, the thicker the resulting coating and conversely, the more dilute the slips are in solids, the thinner the resulting coating. Preferred ranges for solids concentrations in the slips range from about 20% to about 75%, such as from about 35% to about 60%. Viscosity modification through addition of a polymer may also be used to tailor thicknesses. In addition, use of an inorganic binder, such as that of an alcohol-dispersed colloidal boehmite, can result in a significant increase in the coating green strength. Additional exemplary binders include colloidal silica capable of being dispersed in IPA, tetraethylorthosilicate (TEOS), tetramethylorthosilicate (TMOS), and polyvinyl butyral. When using a binder that converts to inorganic material upon heating, the green slip chemistry should preferably be adjusted to account for this additional inorganic to achieve the desired fired chemistry (AT, mullite, etc).

TABLE 1

| Small pore size coating composition | | Medium pore size coating composition | |
|---|---|---|---|
| Component | Wt % | Component | Wt % |
| Alumina | 49.78 | Alumina | 49.78 |
| Titania | 30.28 | Titania | 30.28 |
| Silica | 10.31 | Silica | 10.31 |
| Strontium carbonate | 8.09 | Strontium carbonate | 8.09 |
| Calcium carbonate | 1.35 | Calcium carbonate | 1.35 |
| Lanthanum oxide | 0.19 | Lanthanum oxide | 0.19 |
| Total | 100.00 | Total | 100.00 |
| Rice starch (super addition) | 20.00 | Corn starch (super addition) | 20.00 |

Figure 6A:
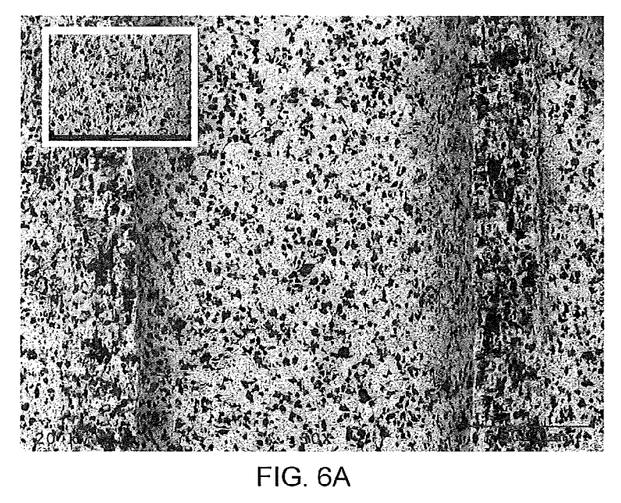
FIGS. 6A-6B show SEM images of two samples after firing, wherein a substrate was and was not coated with a coating layer.
Figure 6B:
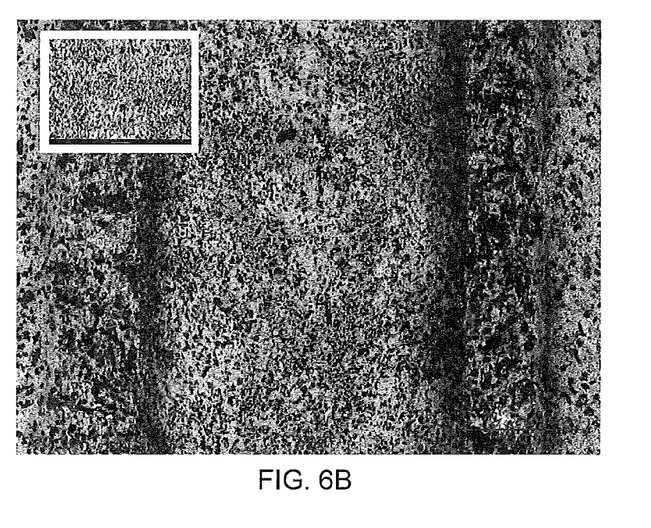

FIGS. 6A and 6B show SEM images of top-down channel views of two samples, wherein in the first sample, shown in FIG. 6A, a substrate was not coated with a coating layer and in the second sample, shown in FIG. 6B, a substrate was coated on inlet channel surfaces with a coating layer as disclosed herein. Differences in surface porosity and pore size distribution were quantified through image analysis, where the surface of the uncoated substrate was found to have a total surface porosity of 26.5% and the surface of a coated channel on the coated substrate was found to have a total surface porosity of 33.1%.

Figure 7A:
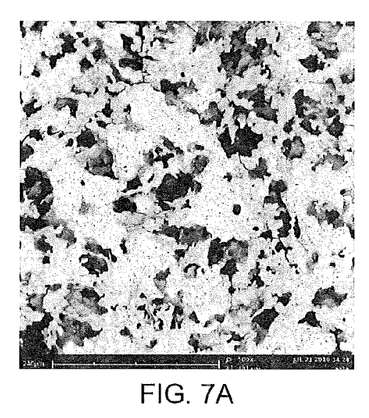
FIGS. 7A-7C show SEM surface images of fired ceramics for a bare substrate, a coated substrate with no added pore former, and a coated substrate with pore former.
Figure 7B:
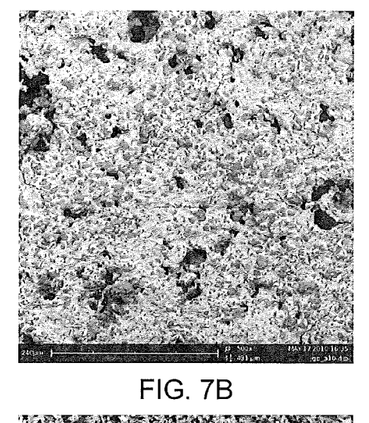
Figure 7C:
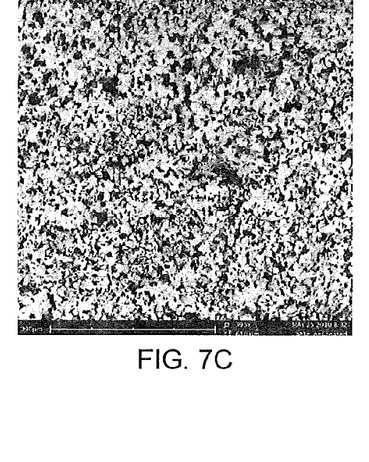

FIGS. 7A through 7C show SEM images of top-down channel views of fired ceramics. FIG. 7A shows an uncoated ceramic channel. FIGS. 7B and 7C show the surfaces of coated ceramics. The ceramic coating in FIG. 7B was generated from a slip having a 2:1 ratio of A10-325 alumina to isopropyl alcohol (IPA). The ceramic coating in FIG. 7C was generated from a slip having a 2:1 ratio of solids to IPA, wherein the solids included about 75% of A10-325 alumina and about 25% pore former (rice starch). The change in pore size and porosity is readily apparent.

The thickness of the coating layer can be altered by varying the slurry concentration, slurry viscosity, and/or number of coats. For DPF applications, the coating should preferably be as thin as possible while minimizing deep bed filtration. For example, subsequent to a firing step, the ratio of the thickness of the coating layer to a wall on the channel on which it is coated can be least about 1:100, including at least about 1:50, and further including at least about 1:20, such as about 1:100 to 1:2, and further such as about 1:50 to 1:2, and yet further such as from about 1:20 to about 1:2, including from about 1:10 to about 1:4, and further including from about 1:10 to about 1:5.

For example, for a wall thickness of about 200 microns, the thickness of the coating layer subsequent to a firing step can be at least about 2 microns, including at least about 5 microns, and further including at least about 10 microns, such as from about 2 to about 50 microns, and further such as from about 5 to about 50 microns, and yet further such as from about 10 to about 50 microns.

In preferred embodiments, the minimum thickness of the coating layer subsequent to a firing step is about the same as the average pore size of pores in the coating layer. For example, if the pores in the coating layer have an average pore size of 5 microns, then the thickness of the coating layer is preferably at least about 5 microns. If the pores in the in the coating layer have an average pore size of 2 microns, then the thickness of the coating layer is preferably at least about 2 microns.

In one set of preferred embodiments, the thickness of the coating layer can be approximately constant along the plurality of channels on which it is coated. In another set of preferred embodiments, the thickness of the coating layer can vary along the axial length of least one of the plurality of channels. For example, the thickness of the coating layer can be at least 1.1 times greater, such as at least 1.2 times greater, further such as at least 1.5 times greater, and still further such as at least 2 times greater at a first point along the axial length of the channel than at a second point along the axial length of the channel.

In yet another set of preferred embodiments, the thickness of the coating layer can vary along different channels. For example the thickness of the coating layer can be greater along channels that are nearer to the central longitudinal axis of the cellular ceramic body than those that are farther (i.e., more radially outward) from the central longitudinal axis of the cellular ceramic body, such that the thickness of the coating layer most thickly coated on a channel is at least 1.1 times greater, and further such as at least 1.2 times greater, and still further such as at least 1.5 times greater, and still yet further such as at least 2 times greater than the thickness of the coating layer most thinly coated on a channel.

The thickness of the coating layer can also be expressed in terms of a closed frontal area increase. Preferably, the coating should provide for a closed frontal area increase of at least 1%, such as from 1-25%, and further such as from 1-10%, including from 2-10%. For example, for a part having 300 cells per square inch with 8 mil thick walls, a 1% increase in closed frontal area corresponds to about a 2 micron thick coating layer.

The thickness of the coating layer may also vary along the axial length of least one of the plurality of channels such that the closed frontal area is at least 5%, such as at least 10%, and further such as at least 20% greater at a first point along the axial length of the channel than at a second point along the axial length of the channel.

Exemplary embodiments disclosed herein include those in which the coating layer extends along the entire length of the channel or channels on which it is coated or extends only partially along the length of the channel or channels on which it is coated. Exemplary embodiments also include those in which the coating layer extends along the entire length of at least one channel and only partially extends along the length of at least one other channel.

Subsequent to a firing step, the surface porosity of the coating layer can be the same or different than the surface porosity of a wall on the channel on which it is coated. Differences in surface porosity can be quantified, for example, through image analysis. For example, the surface porosity of the coating layer can be at least 5% greater, such as at least 10% greater, and further such as at least 20% greater, and yet further such as at least 30% greater, and still yet further such as at least 50% greater than the surface porosity of a wall on the channel on which it is coated. The surface porosity may also be at least 5% less than, such as at least 10% less than, and further such as at least 20% less than, and yet further such as at least 30% less than, and still yet further such as at least 50% less than the surface porosity of a wall on the channel on which it is coated.

Subsequent to a firing step, the average pore diameter of pores in the coating layer can be the same or different as the average pore diameter of pores in a wall on a channel on which it is coated. Average pore diameter can be measured, for example, by mercury porosimetry. For example, the average pore diameter of pores in the in the coating layer can be at least 5% smaller, such as at least 10% smaller, and further such as at least 20% smaller, and yet further such as at least 30% smaller, and still yet further such as at least 50% smaller than the average pore diameter of pores in a wall on the channel on which it is coated. The average pore diameter of pores in the coating layer may also be at least 5% larger, such as at least 10% larger, and further such as at least 20% larger, and yet further such as at least 30% larger, and still yet further such as at least 50% larger than the average pore diameter of pores in a wall on the channel on which it is coated.

Figure 8:
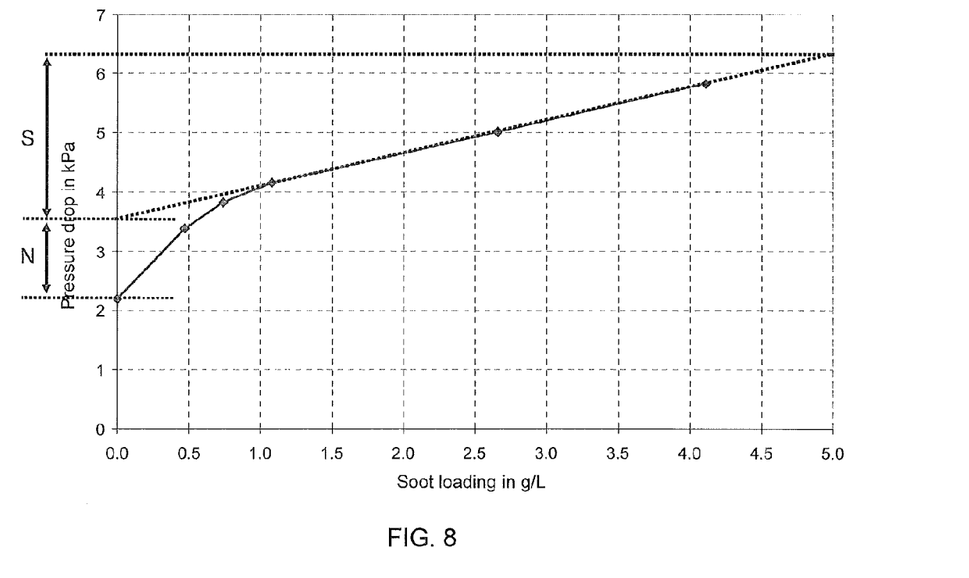
FIG. 8 illustrates noise to signal ratio (N/S) upon soot loading.

FIG. 8 illustrates noise to signal ratio upon soot loading (denoted N/S). The signal (S) in this case is the pressure drop at 5 g/L soot loading, while the noise (N) is the pressure drop associated with deep bed filtration, such that a larger noise-to-signal ratio indicates a higher amount of deep bed filtration.

Figure 9A:
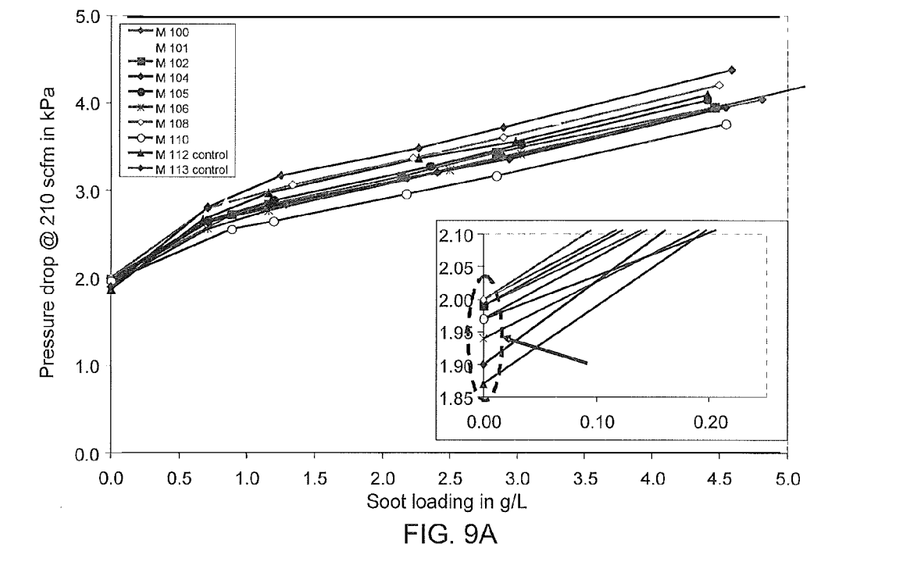
FIGS. 9A-9B plot pressure drop and N/S data for different plugged DPF-style filters.
Figure 9B:
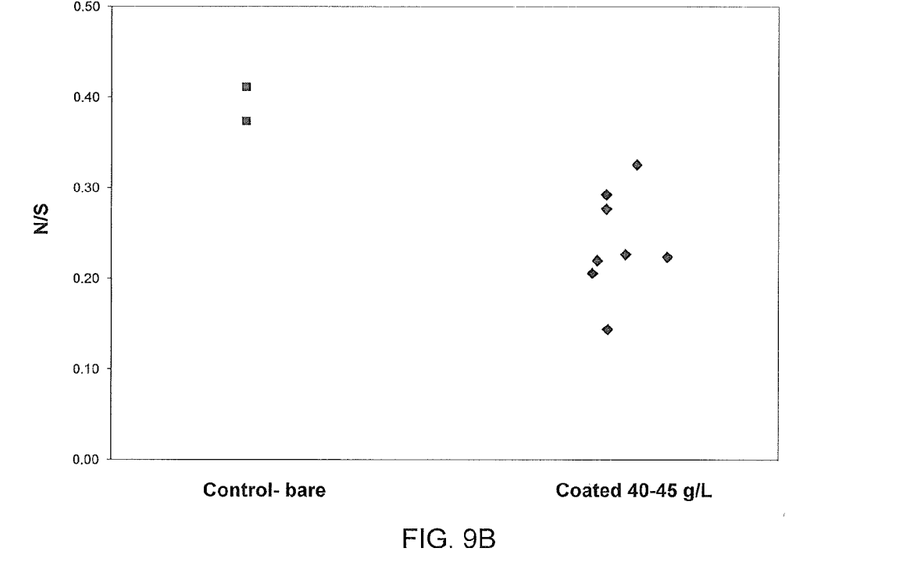

FIG. 9A shows pressure drop data for 2"×6" plugged DPF-style filters at 26.5 scfm and room temperature as function of the soot load (Printex U) while FIG. 9B shows the decrease in N/S upon coating for these parts.

Figure 10A:
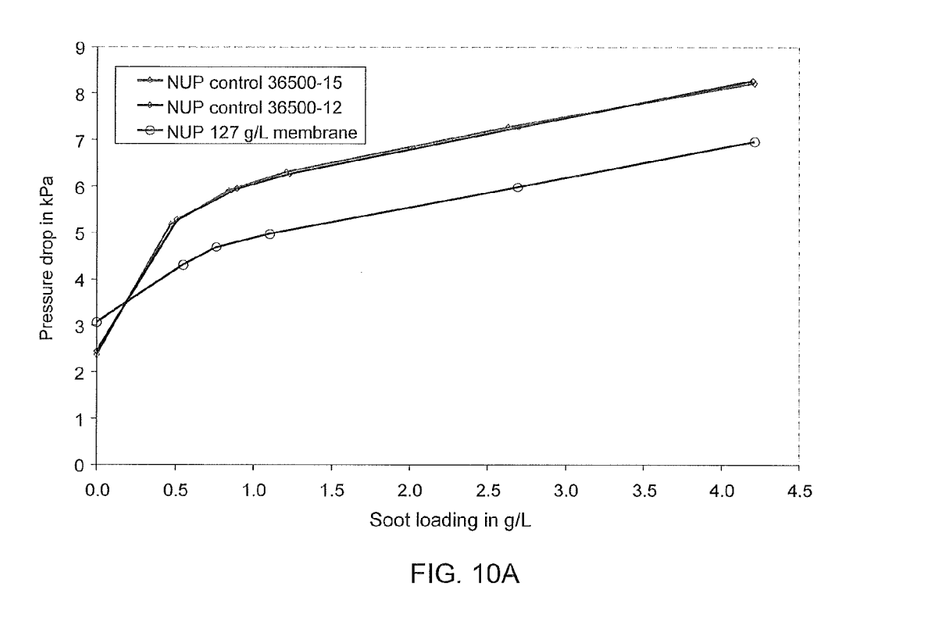
FIGS. 10A-10B plot pressure drop and N/S data for plugged DPF-style filters having coated and uncoated channels.
Figure 10B:
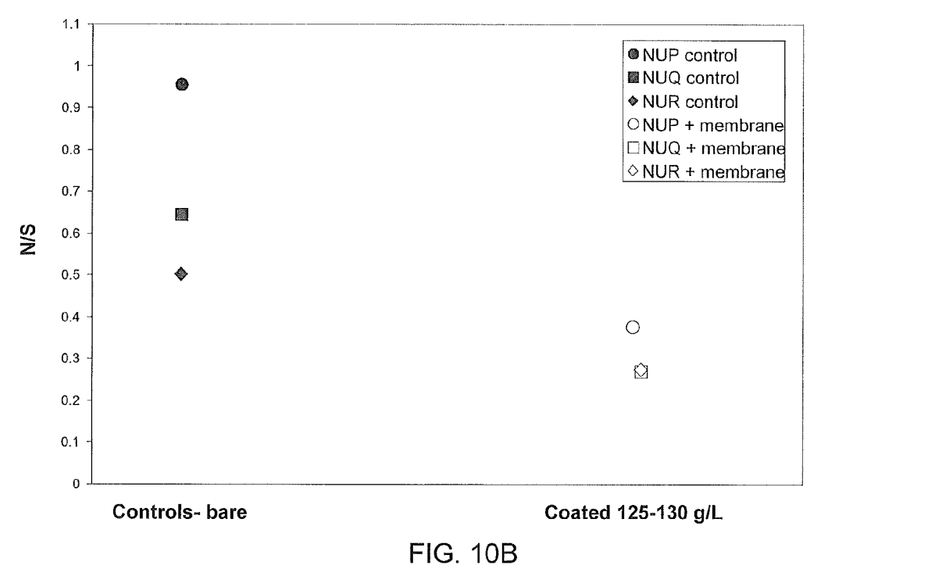

FIGS. 10A and 10B compare pressure drop (FIG. 10A) and deep bed filtration (FIG. 10B) for coated and uncoated 2"×6" filters. As can be seen in FIGS. 10A and 10B, the uncoated filter had significant deep bed filtration which was reduced in the coated filter. As can be seen from FIGS. 10A and 10B, the coating in these examples appears to raise the clean pressure drops while lowering the soot-loaded pressure drops.

Accordingly, subsequent to firing and plugging steps, the cellular ceramic article preferably exhibits a decrease in the soot-loaded pressure drop noise to signal ratio compared to an uncoated filter. In certain preferred embodiments, subsequent to firing and plugging steps, the cellular ceramic article exhibits a pressure drop upon soot loading noise to signal ratio of less than about 0.4, such as less than about 0.35, and further such as less than about 0.3, such as from 0.2 to about 0.4, and further such as from about 0.2 to about 0.35, and still further such as from about 0.2 to about 0.3.

Figure 11:
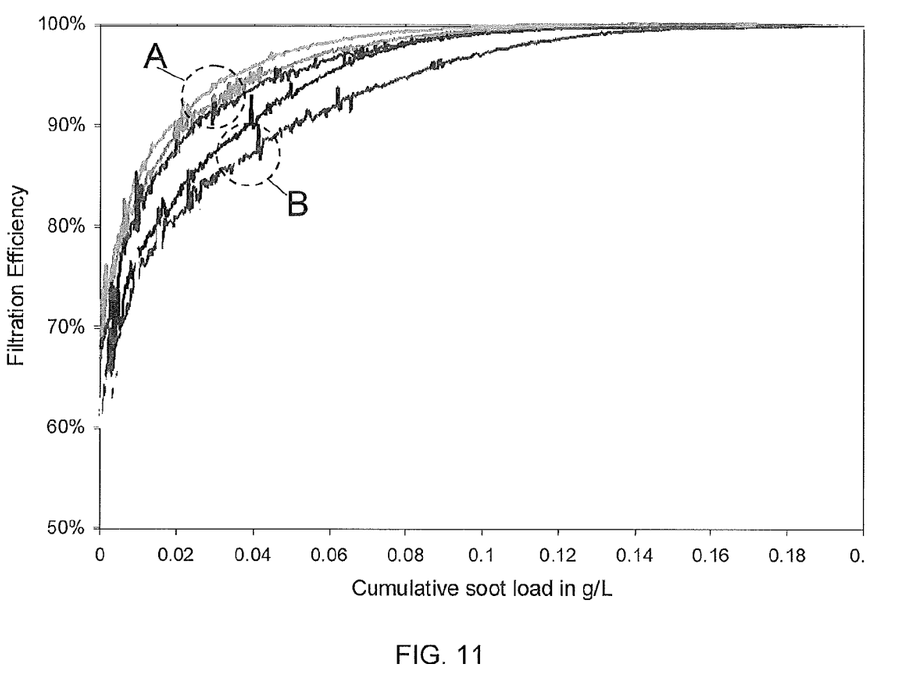
FIG. 11 shows filtration efficiency as a function of soot-loading for coated and uncoated DPF filters.

FIG. 11 plots the mass-based filtration efficiency for membrane-coated A and uncoated B filters. The efficiency is not only higher at every soot-loading with a membrane, but it also reaches 100% efficiency at a lower soot-loading than the uncoated filters.

Figure 12:
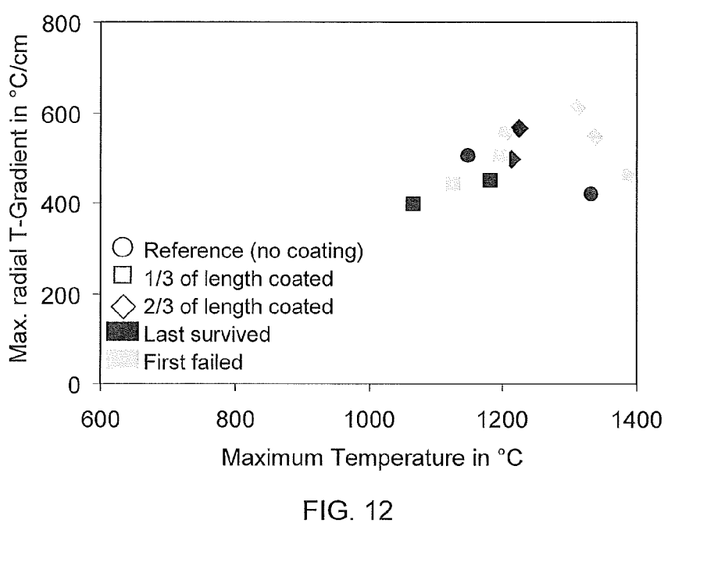
FIG. 12 plots survivability test results for different plugged DPF-style filters having channels that have been coated with varying amounts of coating.

FIG. 12 shows results from test performed in laboratory regeneration experiments with 2"×6" filters coated over different lengths. Included are reference parts without coating as well as two sets in which the filter has been coated over ⅓ and ⅔ of the length with a coating. In the experiments, the soot load (Printex U) is successively increased and then a "worst case" regeneration is performed, resulting in extreme temperatures and temperature gradients inside the filter. The temperatures and gradients are measured through several thermocouples installed inside the filter (Type K and Type S thermocouples are used depending on the temperature range). As the soot load increases, the temperatures and gradients increase. The integrity of the filter is evaluated after each test and testing is stopped when damage, i.e. cracking, is observed. The results shown indicate the last survived and the first failed temperatures and gradients. Two samples are used for each filter condition. It can be seen that both coated candidates perform similarly to the reference samples, with the parts coated over only ⅓ being slightly lower in failure conditions. Overall, this suggests that the coating does not result in compromised thermo-mechanical properties.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of manufacturing a cellular ceramic article comprising:
   providing a green cellular ceramic body comprising a binder material and a plurality of channels; and
   coating at least one of the plurality of channels with a slurry comprising a green coating composition and a solvent to form a coating layer on at least one of the plurality of channels;
   wherein the binder material is insoluble in the solvent and the at least one of the plurality of channels is unplugged when coated with the slurry; and
   wherein the solvent comprises at least primary, secondary, or tertiary alcohol selected from the group consisting of methanol, ethanol, propanol, butanol, pentanol, and hexanol.

2. The method of claim 1, wherein the solvent comprises at least one of an alcohol, ester alcohol, ester, hydrocarbon, aldehyde, ketone, and carboxylic acid.

3. The method of claim 1, wherein the green cellular ceramic body comprises at least one material that upon firing reacts to form at least one material selected from the group consisting of aluminum titanate (AT), metals, intermetallics, mullite, cordierite, alumina ($Al_2O_3$), silicon carbide (SiC), silicon nitride ($Si_3N_4$), silicon aluminum oxynitride (SiAlON), and zeolites.

4. The method of claim 1, wherein the binder material comprises at least one cellulose ether.

5. The method of claim 1 wherein the green coating composition comprises at least one material that upon firing reacts to form at least one material selected from the group consisting of aluminum titanate (AT), metals, intermetallics, mullite, cordierite, alumina ($Al_2O_3$), zircon, alkali and alkaline-earth alumino-silicates, spinels, persovskites, zirconia, ceria, silicon carbide (SiC), silicon nitride ($Si_3N_4$), silicon aluminum oxynitride (SiAlON), and zeolites.

6. The method of claim 1, wherein at least one of the plurality of channels is masked prior to coating any of the plurality of channels and the slurry is coated only on the channel or channels that are not masked.

7. The method of claim 5, wherein channels intended to be plugged as outlet channels are masked and the slurry is coated only on channels that are intended to be plugged as inlet channels.

8. The method of claim 1, wherein the step of coating at least one of the plurality of the channels with the slurry comprises at least one method selected from pouring the slurry down at least one of the channels (waterfall method), dipping the green cellular ceramic body in the slurry, using a vacuum to pull the slurry on the channels, and pumping the slurry onto the channels.

9. The method of claim 1, wherein, subsequent to a firing step, the ratio of the thickness of the coating layer to a wall on the channel on which it is coated is at least about 1:100.

10. The method of claim 1, wherein the thickness of the coating layer increases the closed frontal area of the filter from 1-25%.

11. The method of claim 1, wherein, subsequent to a firing step, the thickness of the coating layer varies along the axial length of least one of the plurality of channels such that the closed frontal area is at least 5% greater at a first point along the axial length of the channel than at a second point along the axial length of the channel.

12. The method of claim 1, wherein, subsequent to a firing step, the surface porosity of the coating layer is at least 5% greater than the surface porosity of a wall on the channel on which it is coated.

13. The method of claim 1, wherein, subsequent to a firing step, the average pore diameter of pores in the coating layer is at least 5% smaller than the average pore diameter of pores in a wall on the channel on which it is coated.

14. The method of claim 1, wherein, subsequent to a firing step, the average pore diameter of pores in the coating layer is at least 5% greater than the average pore diameter of pores in a wall on the channel on which it is coated.

15. The method of claim 1, wherein, subsequent to firing and plugging steps, the cellular ceramic article exhibits a decrease in the soot-loaded pressure drop noise to signal ratio compared to an uncoated filter.

16. The method of claim 1, wherein the cellular ceramic article exhibits an increase in filtration efficiency at a given soot-loading compared to an uncoated filter.

* * * * *